Dec. 4, 1945.    J. M. AUZIN    2,390,070
ADHESION PREVENTING AGENT FOR CATHETERS AND THE LIKE
Original Filed May 31, 1941    2 Sheets-Sheet 2

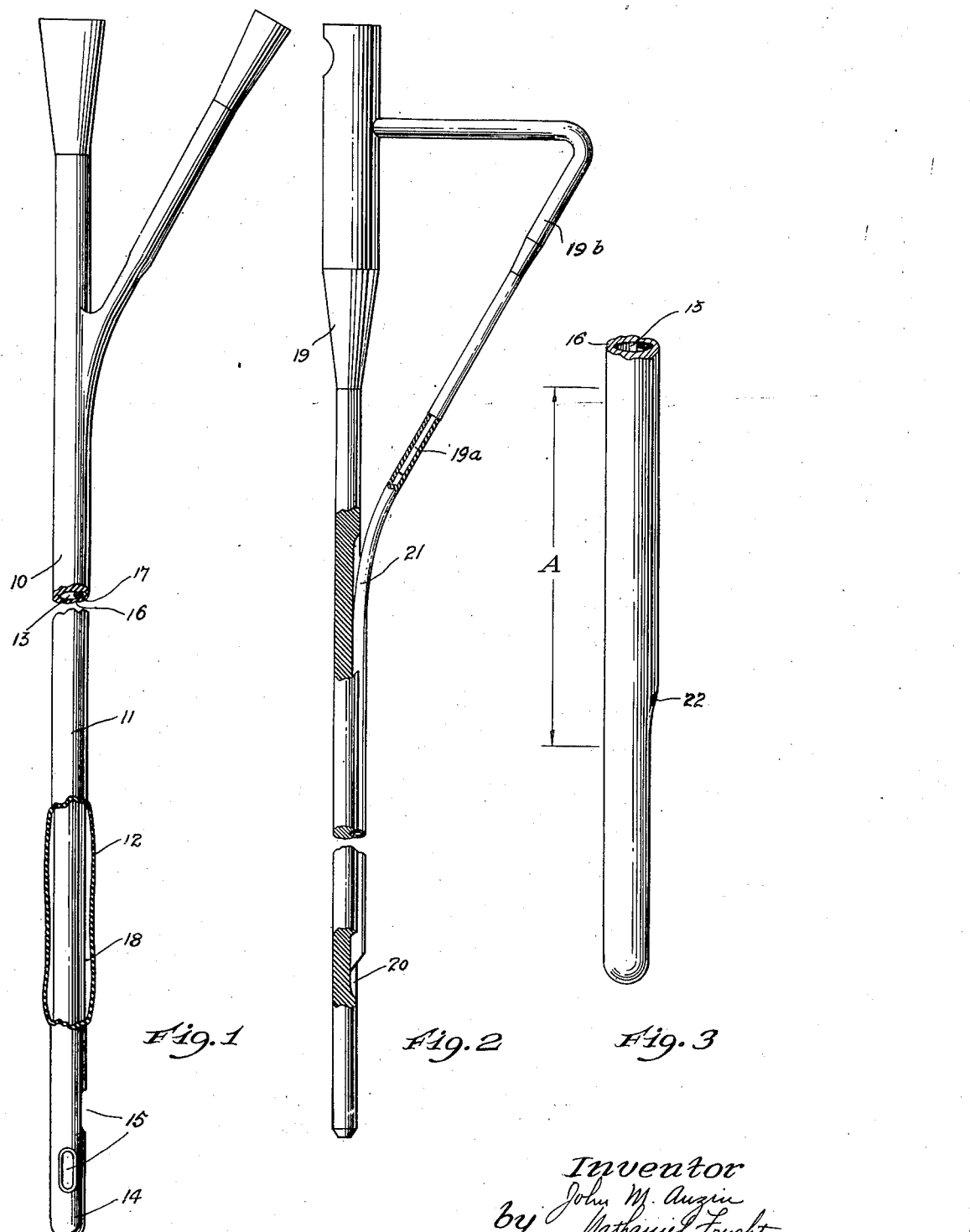

Inventor
John M. Auzin
by Nathaniel Frucht
Attorney

Patented Dec. 4, 1945

2,390,070

UNITED STATES PATENT OFFICE 2,390,070

ADHESION PREVENTING AGENT FOR CATHETERS AND THE LIKE

John M. Auzin, Warwick, R. I., assignor to Davol Rubber Company, a corporation of Rhode Island Original application May 31, 1941, Serial No. 395,981. Divided and this application August 24, 1943, Serial No. 499,863

3 Claims. (Cl. 18—58)

This application is a division of my copending application Serial No. 395,981, filed May 31, 1941, entitled Inflatable catheter.

The object of the invention is to provide an improved adhesion preventing means for the manufacture of balloon catheters and the rubber articles having inflatable portions.

The invention consists of a novel adhesion preventing means more fully disclosed in the detailed description following, in conjunction with the accompanying drawings, and more specifically defined in the claims appended thereto.

In the drawings:

Fig. 1 is a view, partly broken away, of an inflatable catheter constructed in accordance with my invention, the catheter being deflated;

Fig. 2 is an elevation, partly broken away, of the catheter former;

Fig. 3 is a fragmentary view showing the lower end of a partially formed catheter;

Figure 4:
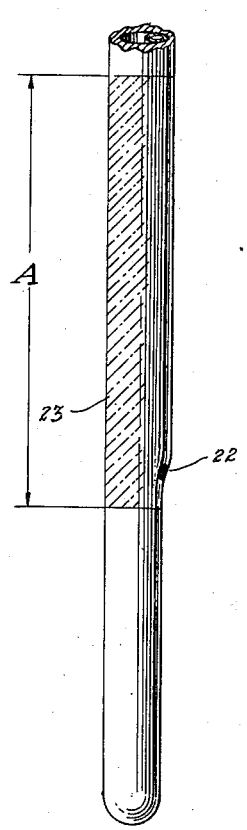
Fig. 4 is a view similar to Fig. 3, showing the application of an adhesion preventing material.
Figure 5:
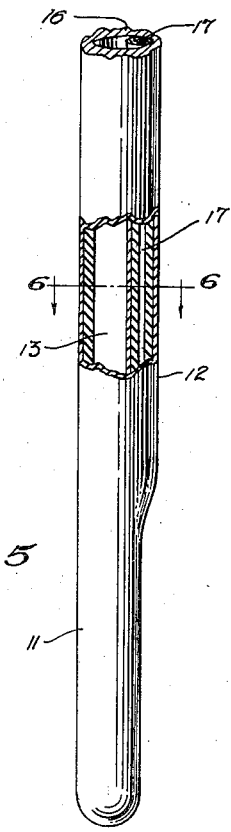
Fig. 5 is a fragmentary view, partly in section, showing the lower end of the catheter after final dipping.
Figure 6:
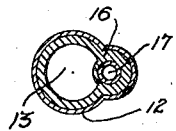
Fig. 6 is a section on the line 6—6 of Fig. 5.

Referring to the drawings, the catheter 10 includes a tubular section 11 and an inflatable balloon section 12, preferably made as an integral one piece device, the tubular section having a central longitudinal flow passage 13 terminating at the tip end 14 and having one or more fluid ducts 15 through the section wall 16 as shown in Fig. 1, the wall 16 having a longitudinal passageway 17 which terminates in a wall recess 18 formed between the balloon section and the wall.

The catheter is preferably formed as a one-piece article by dipping a former 19, see Fig. 2, having a longitudinal groove 20. This former is dipped in rubber solution, either natural or synthetic, until a thin rubber layer is obtained. Then a rubber tube 21 is coated with rubber cement, and is inserted in the grooved portion over the formed layer; the tube is bevelled off at the lower end, the opening therein being plugged with a drop of rubber, preferably latex. The upper end is inserted over a pin 19a on a funnel forming arm 19b which is secured to and is part of the end of the former 19, this pin sealing the lower end so that no rubber can enter the tube, and facilitating the formation of an integral funnel end for the upper end of the inflation tube. Since the pin has an initial rubber coat as the result of the first dippings, this coat is removed from the pin before the end of the tube is pushed over it. The dipping is continued, a small drop of coloring matter being applied after each dip to mark the end of the tube 21, in order to mark the place for making the desired connecting opening. When the catheter has been sufficiently built up, the form and the catheter are placed in a cold water bath, a hole being burned through the wall at the colored spots to make a connecting opening 22 to the interior of the tube 21, the preferred spacing being just below the tube end, to avoid making the opening through the marking ink. The form and the catheter are removed from the cold water bath, surface dried with cheese cloth or the like, and the region A, see Fig. 3, where the balloon is to be formed, is then treated with a local adhesive preventing agent, indicated by the reference numeral 23, to surface treat this region and prevent adhesion of later dips thereto; the local agent is then washed off, and the catheter is placed back in the cold water bath. This treatment leaves a surface area which is clean, and yet prevents adherence of the subsequently dipped coatings. The cold water bath has the effect of preventing uneven drying of the rubber, thus facilitating the production of a uniform thickness for the balloon which is subsequently formed. Each catheter is taken out of the cold water bath, and surface dried with the cheese cloth; the connecting opening or hole 22 is closed or plugged with a drop of latex, and the catheter is again dipped, the resultant layer or layers thus forming a balloon at the region A, as there is no adhesion with the previous layers of rubber. If desired, a layer of rubber cement may be applied at each end of the region A, to ensure a perfect adhesion and an integral joining.

The completed catheter is air dried, stripped from the form, and is put in a drying tray and additionally dried. It is then put in a hot water bath, approximately 80° C., to leach out water soluble proteins from the rubber; then the balloon is loosened by pumping air or water under slight pressure into the passageway 17, and the outer end of the passageway 17 is plugged so as to keep the balloon slightly distended. The inflation of the balloon removes the latex or rubber drop or plug from the connecting hole 22, the plug adhering to the inner wall of the balloon, and clearing the passageway 17.

The catheter is slowly dried for a long period preferably under natural conditions, and is then vulcanized to be ready for use.

Although any adhesion preventing agent may be used to coat the section A before dipping to form the balloon, I prefer bromine as the chemical agent, as it has a tackiness removing action on the rubber. Bromine solution may be used, but I have found that the solution has a tendency to creep beyond the desired limits, and I therefore use the bromine in the form of a paste, obtained by mixing bromine solution with a neutral powder such as Dixie clay. Another local treating agent is bleaching water to which a little sulphuric acid has been added; this is preferably also mixed with a neutral powder such as Dixie clay, which is inert to rubber and does not react with rubber, to form a paste.

While I have described specific means for preventing local adhesion during the formation of a balloon for a catheter, it is obvious that the principle may be used for other types of catheters and other forms of rubber articles, having inflatable portions, without departing from the spirit and the scope of the invention as defined in the appended claims.

I claim:

1. An adhesion preventing material for the manufacture of rubber goods, comprising a mixture of bromine solution and a neutral powder which is inert to and does not react with rubber.

2. An adhesion preventing material for rubber goods manufacture, consisting of a mixture of bromine solution and fine clay.

3. In the manufacture of rubber goods, the steps of treating a rubber base with a paste containing a mixture of bromine solution and a neutral powder which is inert to and does not react with rubber, and coating the treated base with rubber in solution.

JOHN M. AUZIN.